United States Patent
Bhudavaram et al.

(10) Patent No.: US 11,172,243 B2
(45) Date of Patent: Nov. 9, 2021

(54) AUDIENCE AWARE CONTROLLED VIDEO RENDERING

(71) Applicant: International Business Machines Corporation, Armonk, NY (US)

(72) Inventors: Dinesh K. Bhudavaram, Bangalore (IN); Arta B. Chaudhury, Cuttack (IN); Krishnakanth M. Naik, Bangalore (IN); Shyam K. Ramachandra, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/774,908

(22) Filed: Jan. 28, 2020

(65) Prior Publication Data
US 2021/0235143 A1   Jul. 29, 2021

(51) Int. Cl.
*H04N 21/262* (2011.01)
*G10L 15/22* (2006.01)
*H04N 21/422* (2011.01)
*G10L 25/51* (2013.01)
*H04N 21/258* (2011.01)
*G10L 15/04* (2013.01)
*G10L 15/26* (2006.01)

(52) U.S. Cl.
CPC ....... *H04N 21/26258* (2013.01); *G10L 15/04* (2013.01); *G10L 15/22* (2013.01); *G10L 15/26* (2013.01); *G10L 25/51* (2013.01); *H04N 21/25883* (2013.01); *H04N 21/422* (2013.01)

(58) Field of Classification Search
None
See application file for complete search history.

(56) References Cited

U.S. PATENT DOCUMENTS

| 2018/0146054 | A1 | 5/2018 | Hollinger |
| 2018/0152489 | A1 | 5/2018 | Wood et al. |
| 2018/0359477 | A1* | 12/2018 | Yang .................... H04N 19/139 |
| 2019/0253744 | A1 | 8/2019 | Huang |

OTHER PUBLICATIONS

Anonymously, "Intelligent Method for Real-Time Skip Over Video Frames Based on Personal Viewing Policy", IP.com No. IPCOM000235949D, Mar. 31, 2014, 3pages.

* cited by examiner

*Primary Examiner* — Omar S Parra
(74) *Attorney, Agent, or Firm* — Stephen J. Walder, Jr.; Steven Bouknight

(57) ABSTRACT

A mechanism is provided for implementing an audience aware controlled video rendering mechanism for dynamically rendering an age-appropriate content based on identified audience demographics. Utilizing a plurality of segments for content that is to be rendered on a display, where each segment in the plurality of segments has an associated rating for age-appropriateness, a set of playlists is generated for the content where each playlist in the set of playlists comprises a different amount of segments that coincide with the associated rating for age-appropriateness. Age demographics for a set of viewers watching the content is evaluated and utilizing the identified age demographics an age-appropriate playlist from the set of playlists associated with the content is selected. The selected age-appropriate playlist is then rendered on the display.

17 Claims, 3 Drawing Sheets

AUDIENCE AWARE CONTROLLED VIDEO RENDERING

BACKGROUND

The present application relates generally to an improved data processing apparatus and method and more specifically to mechanisms for audience aware controlled video rendering.

There are many different forms of entertainment, i.e. movies, television programs, online videos, or the like, that may be rendered on a display, whether it be a display. However, each type of entertainment has its own rating system and it may be difficult for an individual to keep track of or fully understand what the rating box at the beginning of a movie, television program, or the like, really means. That is, for a television program, ratings are assigned to the television program, are controlled by the network that airs the television program and thus, there is no inter-network consistency in the ratings and worse, there is not even intra-network consistency. For movies, ratings assigned to films are controlled by an "independent" rating board, the Motion Picture Association of America (MPAA), However, there are numerous disagreements about how movie ratings are assigned and the overall design of the ratings system.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for implementing an audience aware controlled video rendering mechanism for dynamically rendering an age-appropriate content based on identified audience demographics. The illustrative embodiment generates a set of playlists for the content where each playlist in the set of playlists comprises a different amount of segments that coincide with the associated rating for age-appropriateness utilizing a plurality of segments for content that is to be rendered on a display, where each segment in the plurality of segments has an associated rating for age-appropriateness. The illustrative embodiment evaluates age demographics for a set of viewers watching the content. Utilizing the identified age demographics, the illustrative embodiment selects an age-appropriate playlist from the set of playlists associated with the content. The illustrative embodiment renders the selected age-appropriate playlist on the display.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
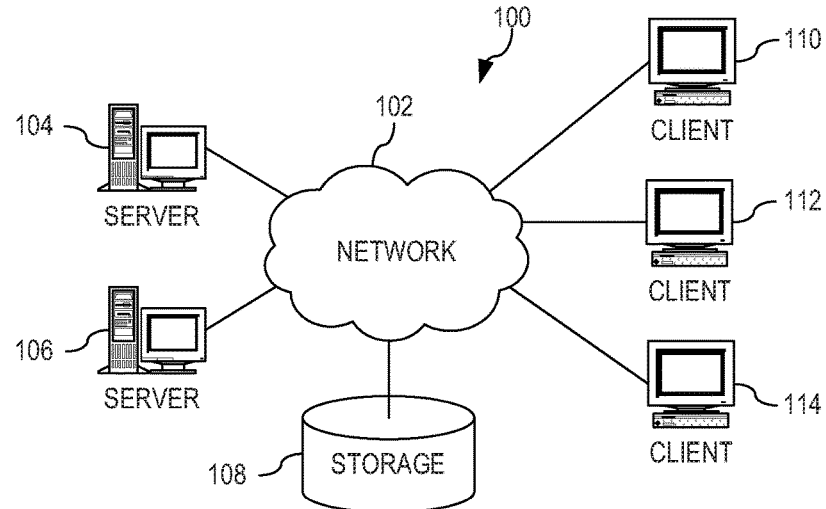
FIG. 1 is an example diagram of a distributed data processing system in which aspects of the illustrative embodiments may be implemented.

Currently every movie, film, video, program, or the like, hereinafter referred to as content, that has been through a review board, receives a Certified for Age Appropriateness certificate, which is displayed at the beginning of the content. However, the certificate is actually part of the content, embedding within metadata associated with the content. While many content providers perform a decent job of checking signals, such as the content's metadata, title, language, or the like, in order to restrict access to the content, many times live stream content fails to have pre-context/information available for screening/filtering. Further, sometimes the metadata associated with the content may not be up to date. That is, ratings change and the metadata associated with some content may fail to reflect the most recent ratings.

Furthermore, as the audience may change, i.e. one or more persons of different ages coming into or leaving the room where the content is being viewed, the rendering of the content may need to change so as to address the audience in the room. That is, different persons ranging from children to the elderly may be sensitive to acts of terror, mentally disturbing scenes including violence, blood shed, obscene scenes, and curse words, or the like. In rendering content, especially live content, currently it is not possible to restrict streaming and/or rendering of the content. More specifically, once rendering of live or previously recoded content starts, currently it is not possible to dynamically control the rendering to suit a changing audience.

Thus, the illustrative embodiments provide an audience aware controlled video rendering mechanism that addresses both live stream content as well as other video content. The audience aware controlled video rendering mechanism of the illustrative embodiments provides a look-ahead content analyzer that analyzes content as it is received for one or more of sound, images, transcripts, video, or the like, to identify age sensitive content a predetermined time period prior to the actual scene of the content being rendered. Then, based on the audience demographics, the audience aware controlled video rendering mechanism automatically controls whether the scene is rendered or some other content is rendered. That is, with the audience aware controlled video rendering mechanism in place, certain scenes of the content, such as scenes with blood-shed, age-sensitive songs, fight sequences, or any other content identified as inappropriate based on the audience in the room where the content is being rendered may be skipped, replaced with other content. One advantage of the audience aware controlled video rendering mechanism is that multiple (i.e. edited, cut, masked, or the like versions of the content does not need to be maintained. That is, only one version of the content needs to be provided, either live or recorded and the audience aware controlled video rendering mechanism controls the content that is to be rendered appropriate to audience viewing the content.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
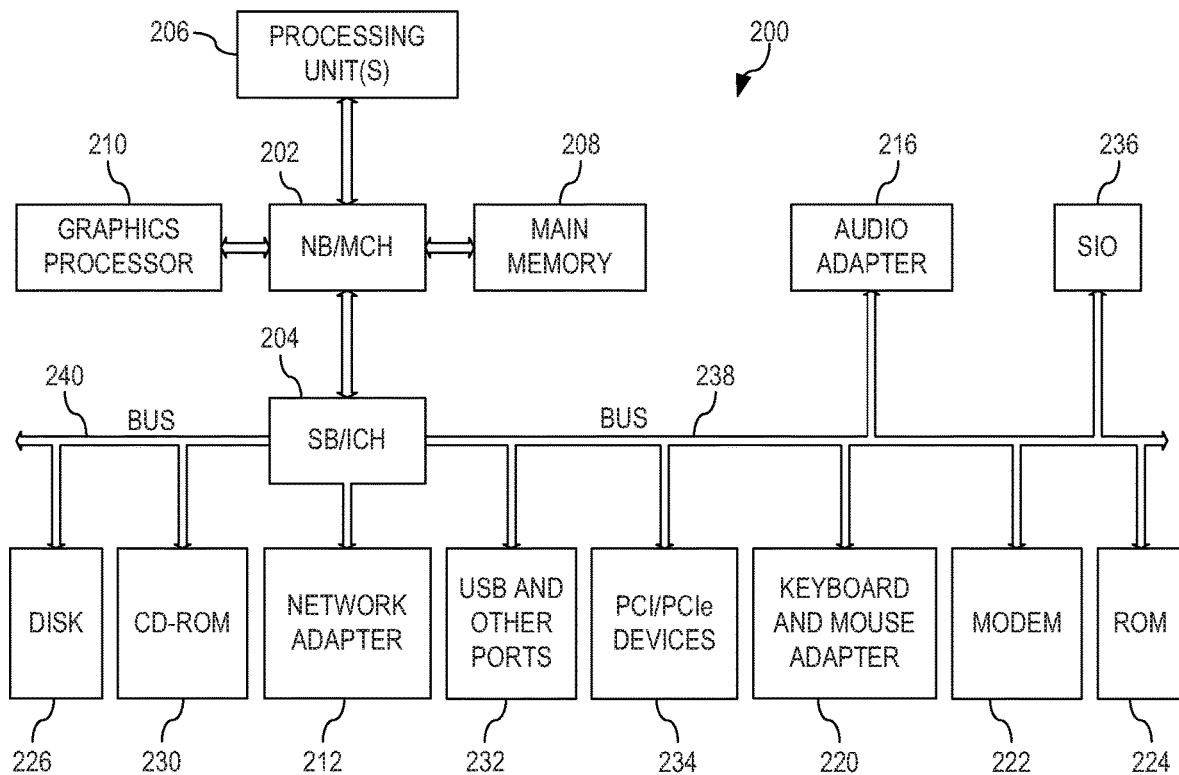
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an audience aware controlled video rendering mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates rendering content based on based on the audience demographics.

As noted above, the mechanisms of the illustrative embodiments utilize specifically configured computing devices, or data processing systems, to perform the operations for rendering content based on based on the audience demographics. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the audience aware controlled video rendering mechanism that renders content based on based on the audience demographics.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
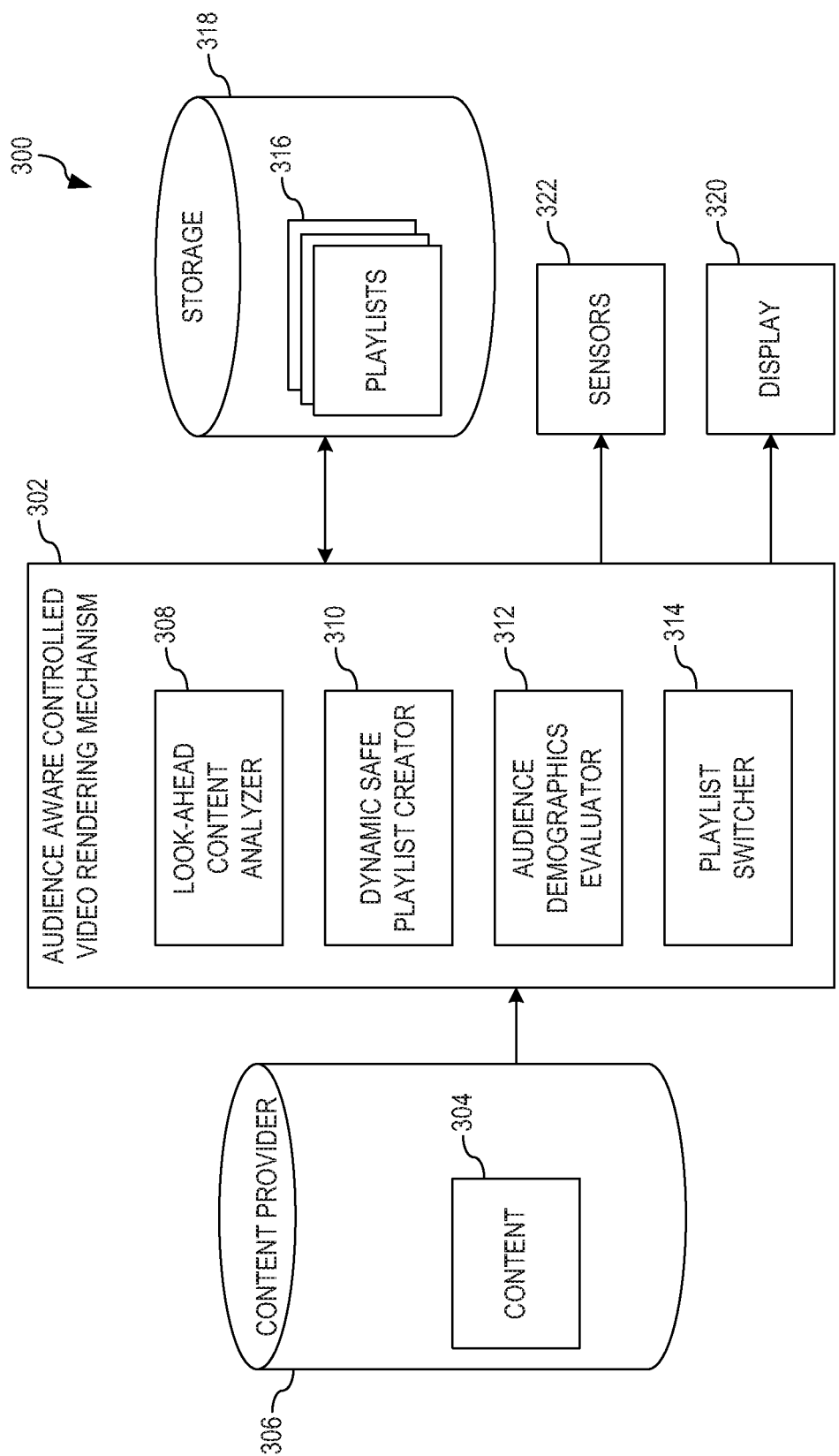
FIG. 3 depicts a functional block diagram of an audience aware controlled video rendering mechanism in accordance with an illustrative embodiment.

FIG. 3 depicts a functional block diagram of an audience aware controlled video rendering mechanism in accordance with an illustrative embodiment. Data processing system 300, which may be a data processing system, such as data processing system 200 of FIG. 2, comprises audience aware controlled video rendering mechanism 302 which receives content 304 from content provider 306. Content provider 306 may be any provider of content such as television programs, movies, or the like. Audience aware controlled video rendering mechanism 302 comprises look-ahead content analyzer 308, dynamic safe playlist creator 310, audience demographics evaluator 312, and playlist switcher 314.

Upon receiving content 304 from content provider 306, look-ahead content analyzer 308 applies video content analysis (VCA) to either segment content 304 into a plurality of time-period based segments or identify a time-period based segmentation of content 304. If content 304 is not already segmented into a set of time-period based segments, such as segments of a time period of 10 seconds, 15 seconds, or the like, look-ahead content analyzer 308 generates each time-period based segment, such as segments of a time period of 10 seconds, 1.5 seconds, or the like. For each segment, look-ahead content analyzer 308 then uses one or more of video, sound, image, transcript, or the like, analysis to associate a rating for the segment based on the predefined content rating system, which may be, as an example, similar to:

General Audiences—Nothing that would offend parents for viewing by children.
Parental Guidance Suggested—Some material may not be suitable for children. Parents urged to give "parental guidance". May contain some material parents might not like for their young children.
PG-13—Parents Strongly Cautioned—Some material may be inappropriate for children under 13. Parents are urged to be cautious. Some material may be inappropriate for pre-teenagers.
R—Restricted—Contains some adult material. Parents are urged to learn more about the film before allowing young children to watch.
NC-17—Adults Only—Clearly adult. Children are not to watch.

Based on the identified time-period based segmentation identified or the time-period based segmentation generated by took-ahead content analyzer 308, dynamic safe playlist creator 310 generates a set of playlists 316 in storage 318. Each playlist in the set of playlists 316 differs based on the segments that are included in that playlist in order to coincide with the predefined content rating system, if necessary, such that one playlist is, in accordance with the example above, G rated, one playlist is PG rated, and so on. Thus, for a G-rated movie, dynamic safe playlist creator 310 would only generate one playlist, but for PG-rated movies, dynamic safe playlist creator 310 would generate two playlists with the PG-rated playlist having more segments than the G-rated playlist. It should be noted that the playlists may be dynamic since look-ahead content analyzer 308 is analyzing and segmenting content 304 as is received and thus, dynamic safe playlist creator 310 is adding the analyzed segments to respective playlists in the set of playlists 316 as they are received from look-ahead content analyzer 308, Further, as dynamic safe playlist creator 310 generates the different playlists in the set of playlists 316, if a number of age-inappropriate segments are omitted such that omitting the number of age-inappropriate segments segment may result in a loss of continuity and/or context in viewing content 304, dynamic safe playlist creator 310 may request took-ahead content analyzer 308 perform a further segmentation and rerating of one or more segments until a minimal set of age-inappropriate segments are excluded.

In order to render one playlist of the set of playlists 316, audience demographics evaluator 312 evaluates the audience in the room where the playlist will be displayed on display 320. In evaluating the audience, audience demographics evaluator 312 utilizes one or more sensors 322, such as cameras, microphones, webcam, or the like, to collect key demographic information about viewers such as number of viewers, a gender of each viewer, an age of each viewer, or the like. Audience demographics evaluator 312 is programmed to detect evolving audio information such as names of the kids, pet names of family members, voice/tone. recognition to determine age of audience, greeting messages from a viewer, such as "hey dad," "hello kid," "hello son/daughter," or the like. Utilizing this demographic information, audience demographics evaluator 312 provides playlist switcher 314 an indication of the age associated with the youngest viewer in the audience.

Playlist switcher 314 then uses this indicator to switch to the appropriate playlist in the set of playlists 316 based on age appropriateness of that playlist as identified by the indicator. As audience demographics evaluator 312 is continually monitoring the audience, a change in the detected viewing age of the audience causes audience demographics evaluator 312 to send a new indicator to playlist switcher 314, which then cases playlist switcher 314 to dynamically transition to different age-appropriate playlist. For example, if audience demographics evaluator 312 determines only adults are watching an R-rated movie and a 12 year old child enters the room, then playlist switcher 314 dynamically switches from the R-rated playlist of the set of playlists 316 to the age-appropriate PG-rated playlist of the set of playlists 316.

In accordance with one embodiment of the illustrative embodiments, a user may be able to override which playlist in the set of playlists 316 is being rendered on display 320. However, in order to at least notify the user that segments of the playlists may not be appropriate for all of the audience viewing the playlist, audience demographics evaluator 312 and playlist switcher 314 may display the indication identified by audience demographics evaluator 312 as feedback that an age-inappropriate scene is about to rendered with an option to skip to the next age-appropriate segment, Thus, the illustrative embodiments provide an audience aware controlled video rendering mechanism that provides an age-appropriate control of content rendered on a display based on identified audience demographics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
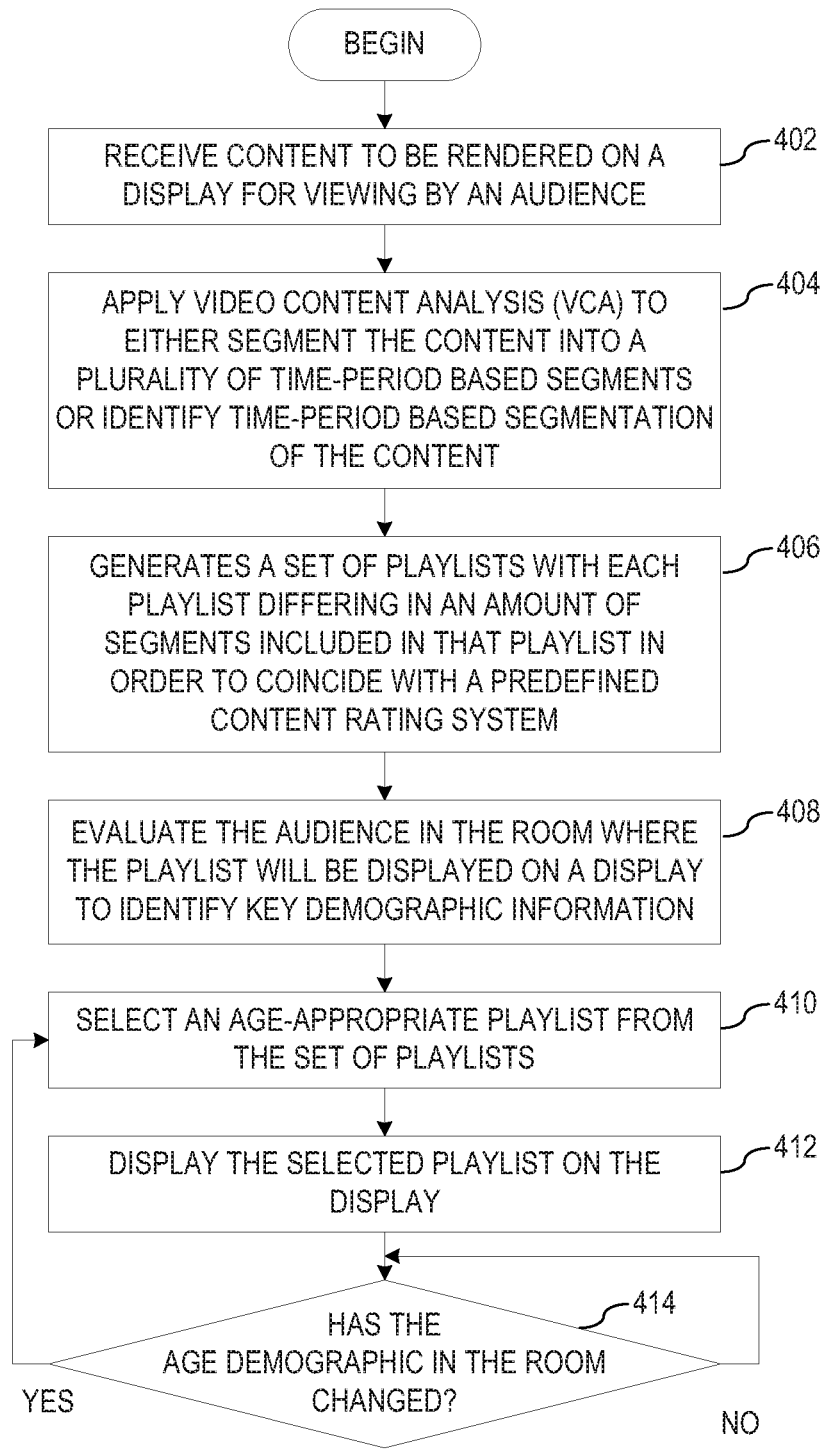
FIG. 4 depicts an exemplary flow diagram of the operation performed by an audience aware controlled video rendering mechanism in rendering an age-appropriate content based on identified audience demographics in accordance with an illustrative embodiment.

FIG. 4 depicts an exemplary flow diagram of the operation performed by an audience aware controlled video rendering mechanism in rendering an age-appropriate content based on identified audience demographics in accordance with an illustrative embodiment. As the operation begins, a look-ahead content analyzer of the audience aware controlled video rendering mechanism receives content to be rendered on a display for viewing by an audience (step 402). The look-ahead content analyzer applies video content analysis (VCA) to either segment the content into a plurality of time-period based segments or identify time-period based segmentation of the content (step 404). Using the identified or generated time-period based segmentation, a dynamic safe playlist creator of the audience aware controlled video rendering mechanism generates a set of playlists (step 406) with each playlist in the set of playlists differing in an amount of segments included in that playlist in order to coincide with a predefined content rating system.

In order to render one playlist of the set of playlists, an audience demographics evaluator of the audience aware controlled video rendering mechanism evaluates the audience in the room where the playlist will be displayed on a display to identify key demographic information about the viewers in the audience such as number of viewers, a gender of each viewer, an age of each viewer, or the like (step 408). Utilizing an age demographic of the key demographics identified by the audience demographics evaluator, a playlist switcher of the audience aware controlled video rendering mechanism selects an age-appropriate playlist from the set of playlists (step 410) and displays the selected playlist on the display (step 412). The audience demographics evaluator continually monitors the audience for a change in the detected viewing age of the audience. Thus, the audience demographics evaluator determines whether the age demographics of the audience has changed (step 414). If at step 414 the audience demographics evaluator determines that the age demographics has changed, then the operation returns to step 410 where the playlist switcher dynamically selects a different age-appropriate playlist from the set of playlists (step 410) and dynamically switches to the different selected playlist on the display (step 412). If at step 414 the audience demographics evaluator determines that the age demographics has not changed, the audience demographics evaluator continues to monitor the audience for a change in the detected viewing age of the audience.

The flowchart and Hock diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for audience aware controlled video rendering that addresses both live stream content as well as other video content. The audience aware controlled video rendering mechanism of the illustrative embodiments provides a look-ahead content analyzer that analyzes content as it is received for one or more of sound, images, transcripts, video, or the like, to identify age sensitive content a predetermined time period prior to the actual scene of the content being rendered. Then, based on the audience demographics, the audience aware controlled video rendering mechanism automatically provides an age-appropriate rendering of the video. That is, with the audience aware controlled video rendering mechanism in place, certain scenes of the content, such as scenes with blood-shed, age-sensitive songs, tight sequences, or any other content identified as inappropriate based on the audience in the room where the content is being rendered may be skipped, replaced with other content. One advantage of the audience aware controlled video rendering mechanism is that multiple (i.e. edited, cut, masked, or the like) versions of the content does not need to be maintained. That is, only one version of the content needs to be provided, either live or recorded and the audience aware controlled video rendering mechanism controls the content that is to be rendered appropriate to audience viewing the content.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for comprising at least one processor and at least one memory, wherein the at least one memory comprises instructions that are executed by the at least one processor to configure the at least one processor to implement an audience aware controlled video rendering mechanism for dynamically rendering an age-appropriate content based on identified audience demographics, the method comprising:

receiving a stream of content comprising a plurality of segments of content that are to be rendered on a display;

dynamically analyzing, while rendering on the display at least one current segment of content in the plurality of segments of content, at least one future segment of content in the plurality of segments of content, by performing at least one of video or audio analysis of content of the at least one future segment of content to determine, for each future segment of content, a dynamically determined associated rating for age-appropriateness, wherein the at least one future segment of content is at least one segment of content, in the plurality of segments of content, that is to be rendered on a display at a future time greater than a predetermined window of time from a current time;

for each future segment of content in the at least one future segment of content, dynamically adding the future segment to a playlist, in a set of playlists, corresponding to a rating of age-appropriateness of the future segment of content, wherein each playlist in the set of playlists corresponds to a different rating of age-appropriateness, and contents of each playlist start empty and are dynamically populated as future segments of content are dynamically analyzed to determine ratings of age appropriateness of the future segments of content;

dynamically evaluating age demographics for a set of viewers watching the content to determine a current age demographic of the set of viewers and determine if a change in age demographics for the set of viewers has occurred based on the current age demographics and a previous age demographics of the set of viewers;

in response to determining that a change in age demographics has occurred, dynamically selecting an age-appropriate playlist, from the set of playlists, that corresponds to a rating of age-appropriateness associated with a current age demographic of the set of viewers; and rendering future segments of content associated with the selected age-appropriate playlist on the display in response to selecting the selected age-appropriate playlist.

2. The method of claim 1, further comprising segmenting the content into the plurality of segments at least by using one or more of video analysis, sound analysis, image analysis, or transcript analysis to segment the content into the plurality of segments with each segment being marked with a rating for age-appropriateness, wherein at least one segment in the plurality of segments has a different rating for age-appropriateness from at least one other segment in the plurality of segments.

3. The method of claim 2, wherein the rating for age-appropriateness is a set of ratings that distinguishes age appropriateness for content to be viewed by a viewer and wherein the set of rating ranges from young children to adults.

4. The method of claim 1, wherein the plurality of segments for the content is received already segmented but not having associated ratings of age-appropriateness, and wherein dynamically analyzing the at least one future segment comprises video analysis, audio analysis, and transcript analysis to mark each future segment with a rating for age-appropriateness, wherein at least one future segment in the plurality of segments has a different rating of age-appropriateness from at least one other segment in the plurality of segments.

5. The method of claim 1, wherein the playlists in the set of playlists are dynamic such that the size of each playlist changes as future segments of the content are dynamically analyzed, and wherein a selected age-appropriate playlist in the set of playlists is displayed on the display prior to an entirety of the content being segmented.

6. The method of claim 1, wherein the evaluation of the age demographics for the set of viewers watching the content is performed using a set of sensors that include one or more of a camera, a microphone, or a webcam.

7. A computer program product comprising a computer readable storage medium having a computer readable program stored therein, wherein the computer readable program, when executed on a data processing system, causes the data processing system to implement an audience aware controlled video rendering mechanism for rendering an age-appropriate content based on identified audience demographics, and further causes the data processing system to:

receive a stream of content comprising of content that is to be rendered on a display;

dynamically analyze, while rendering on the display at least one current segment of content in the plurality of segments of content, at least one future segment of content in the plurality of segments of content, by performing at least one of video or audio analysis of content of the at least one future segment of content to determine, for each future segment of content, a dynamically determined associated rating for age-appropriateness, wherein the at least one future segment of content is at least one segment of content, in the plurality of segments of content, that is to be rendered on a display at a future time greater than a predetermined window of time from a current time;

for each future segment of content in the at least one future segment of content, dynamically add the future segment to a playlist, in a set of playlists, corresponding to a rating of age-appropriateness of the future segment of content, wherein each playlist in the set of playlists corresponds to a different rating of age-appropriateness, and contents of each playlist start empty and are dynamically populated as future segments of content are dynamically analyzed to determine ratings of age appropriateness of the future segments of content;

dynamically evaluate age demographics for a set of viewers watching the content to determine a current age demographic of the set of viewers and determine if a change in age demographics for the set of viewers has occurred based on the current age demographics and a previous age demographics of the set of viewers;

in response to determining that a change in age demographics has occurred, dynamically select an age-appropriate playlist, from the set of playlists, that corresponds to a rating of age-appropriateness associated with a current age demographic of the set of viewers; and render future segments of content associated with the selected age-appropriate playlist on the display in response to selecting the selected age-appropriate playlist.

8. The computer program product of claim 7, wherein the computer readable program further causes the data processing system to segment the content into the plurality of segments at least by using one or more of video analysis, sound analysis, image analysis, or transcript analysis to segment the content into the plurality of segments with each segment being marked with a rating for age-appropriateness, wherein at least one segment in the plurality of segments has a different rating for age-appropriateness from at least one other segment in the plurality of segments.

9. The computer program product of claim 8, wherein the rating for age-appropriateness is a set of ratings that distinguishes age appropriateness for content to be viewed by a viewer and wherein the set of rating ranges from young children to adults.

10. The computer program product of claim 7, wherein the plurality of segments for the content is received already segmented but not having associated ratings of age-appropriateness, and wherein dynamically analyzing the at least one future segment comprises video analysis, audio analysis, and transcript analysis to mark each future segment with a rating for age-appropriateness, wherein at least one future segment in the plurality of segments has a different rating of age-appropriateness from at least one other segment in the plurality of segments.

11. The computer program product of claim 7, wherein the playlists in the set of playlists are dynamic such that the size of each playlist changes as future segments of the content are dynamically analyzed, and wherein a selected age-appropriate playlist in the set of playlists is displayed on the display prior to an entirety of the content being segmented.

12. The computer program product of claim 7, wherein the evaluation of the age demographics for the set of viewers watching the content is performed using a set of sensors that include one or more of a camera, a microphone, or a webcam.

13. An apparatus comprising:
at least one processor; and
at least one memory coupled to the at least one processor, wherein the at least one memory comprises instructions which, when executed by the at least one processor, cause the at least one processor to implement an audience aware controlled video rendering mechanism for rendering an age-appropriate content based on identified audience demographics, and further cause the at least one processor to:
receive a stream of content comprising of content that is to be rendered on a display;
dynamically analyze, while rendering on the display at least one current segment of content in the plurality of segments of content, at least one future segment of content in the plurality of segments of content, by performing at least one of video or audio analysis of content of the at least one future segment of content to determine, for each future segment of content, a dynamically determined associated rating for age-appropriateness, wherein the at least one future segment of content is at least one segment of content, in the plurality of segments of content, that is to be rendered on a display at a future time greater than a predetermined window of time from a current time;
for each future segment of content in the at least one future segment of content, dynamically add the future segment to a playlist, in a set of playlists, corresponding to a rating of age-appropriateness of the future segment of content, wherein each playlist in the set of playlists corresponds to a different rating of age-appropriateness, and contents of each playlist start empty and are dynamically populated as future segments of content are dynamically analyzed to determine ratings of age appropriateness of the future segments of content;
dynamically evaluate age demographics for a set of viewers watching the content to determine a current age demographic of the set of viewers and determine if a change in age demographics for the set of viewers has occurred based on the current age demographics and a previous age demographics of the set of viewers;
in response to determining that a change in age demographics has occurred, dynamically select an age-appropriate playlist, from the set of playlists, that corresponds to a rating of age-appropriateness associated with a current age demographic of the set of viewers; and
render future segments of content associated with the selected age-appropriate playlist on the display in response to selecting the selected age-appropriate playlist.

14. The apparatus of claim 13, wherein the instructions further cause the at least one processor to segment the content into the plurality of segments at least by using one or more of video analysis, sound analysis, image analysis, or transcript analysis to segment the content into the plurality of segments with each segment being marked with a rating for age-appropriateness, wherein at least one segment in the plurality of segments has a different rating for age-appropriateness from at least one other segment in the plurality of segments.

15. The apparatus of claim 13, wherein the plurality of segments for the content is received already segmented but not having associated ratings of age-appropriateness, and wherein dynamically analyzing the at least one future segment comprises video analysis, audio analysis, and transcript analysis to mark each future segment with a rating for age-appropriateness, wherein at least one future segment in the plurality of segments has a different rating of age-appropriateness from at least one other segment in the plurality of segments.

16. The apparatus of claim 13, wherein the playlists in the set of playlists are dynamic such that the size of each playlist changes as future segments of the content are dynamically analyzed, and wherein a selected age-appropriate playlist in the set of playlists is displayed on the display prior to an entirety of the content being segmented.

17. The apparatus of claim 13, wherein the evaluation of the age demographics for the set of viewers watching the content is performed using a set of sensors that include one or more of a camera, a microphone, or a webcam.

* * * * *